Jan. 28, 1964     L. E. PALMER     3,119,895

MOLDED PLASTIC OUTLET BOXES WITH GROUNDING PLATES

Filed March 15, 1961     2 Sheets-Sheet 1

INVENTOR

LEWIS E. PALMER

BY *J. W. Grieshaber*

ATTORNEY

Jan. 28, 1964  L. E. PALMER  3,119,895
MOLDED PLASTIC OUTLET BOXES WITH GROUNDING PLATES
Filed March 15, 1961  2 Sheets-Sheet 2
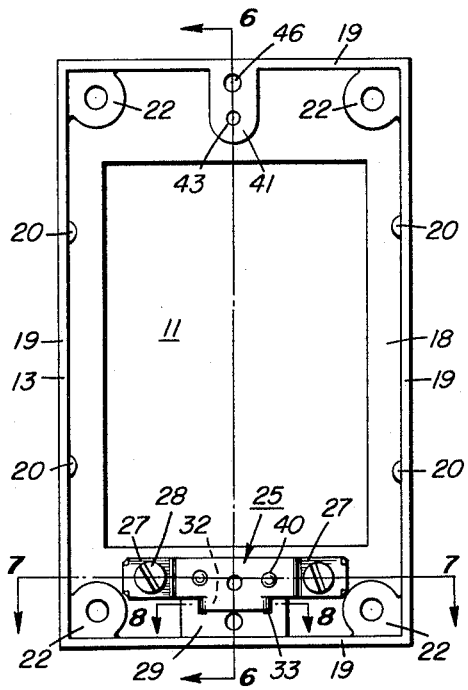
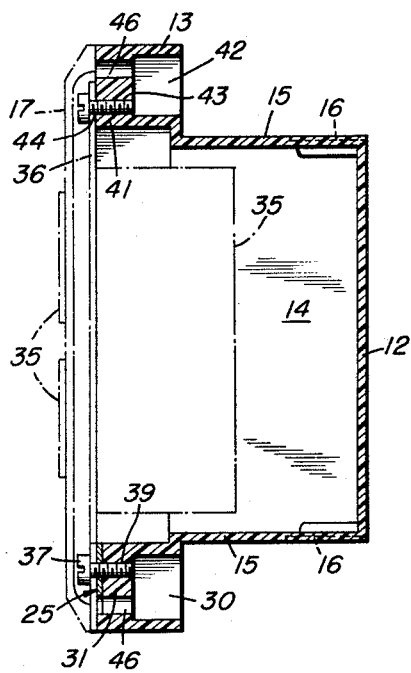
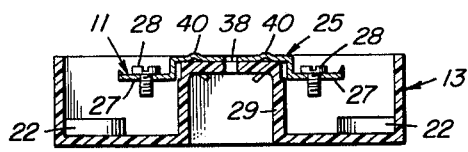
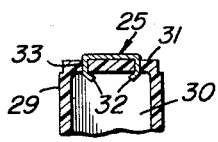
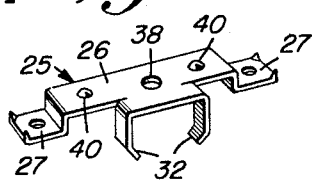
INVENTOR
LEWIS E. PALMER
BY
ATTORNEY United States Patent Office 3,119,895
Patented Jan. 28, 1964

3,119,895
MOLDED PLASTIC OUTLET BOXES WITH GROUNDING PLATES
Lewis E. Palmer, Washington, Lubeck District, W. Va., assignor to Union Insulating Company, Parkersburg, W. Va., a corporation of West Virginia
Filed Mar. 15, 1961, Ser. No. 95,926
3 Claims. (Cl. 174—51)

This invention relates to electrical outlet and junction boxes molded of phenolic resin or similar hard insulating plastic materials and to grounding means used in such insulated boxes.

One object of the invention is to provide a simple and inexpensive means for assuring the continuity of grounding wires through non-metallic boxes of different kinds, by the use of a ground strap or plate so that all non-current-carrying metal parts of switches or other devices that may be mounted on or in such boxes, may be grounded.

Another object of the invention is to so construct the molded insulated box that a grounding plate may be mounted at an end of the usual rectangular box, to permit the ground wires of the cables entering the box through the knockouts or lead-in openings to be easily connected to it in a manner that prevents inadvertent shorts to the ground wire from conductors or other live parts, and also in a manner that will permit an electrical inspector to readily inspect the connections after the installation has been completed.

Another object is to so construct a plastic box of this character that it will be economical to make and practical to use in special applications, such as in "thin" walls now commonly used in mobile homes and in prefabricated dwellings and other building structures.

Another object is to provide a thin or shallow wall box of the above indicated character which has at its open front a surrounding extension or enlargement to overlie the interior face of the wall and provide the following advantages: first, to serve as a mounting means for the box, thereby doing away with the use of metal mounting brackets; second, to increase the cubical capacity of the box so that larger conductors, such as gage 12 or 10, having greater current carrying capacity may be used in a relatively small box; third, to permit of the use in the box of a standard size switch and duplex outlet devices and the use of the standard size cover or wall plate to close the box; and fourth, to provide an effective mounting for the ground strap at the open face of the box so that the ground wires may be readily attached and the connections easily inspected.

With the above and other objects and advantages in view, the invention resides in the novel combinations and arrangements of parts and the novel features of construction hereinafter described and claimed, and illustrated in the accompanying drawings which show the present preferred embodiments of the invention.

In the drawings:

FIG. 5 is a front or face view of the box on an enlarged scale;

FIG. 6 is a longitudinal sectional view taken on the line 6—6 in FIG. 5, but showing in broken lines a duplex outlet device and a wall plate;

FIG. 7 is a transverse section taken on line 7—7 in FIG. 5;

FIG. 8 is a detail sectional view taken on line 8—8 in FIG. 5 showing the manner of fastening the ground strap;

FIG. 9 is a perspective view of the ground strap; and

Figure 1:
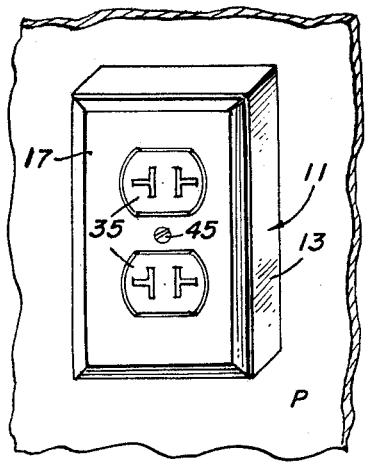
FIG. 1 is a perspective view of a portion of a wall showing my improved box mounted thereon.
Figure 3:
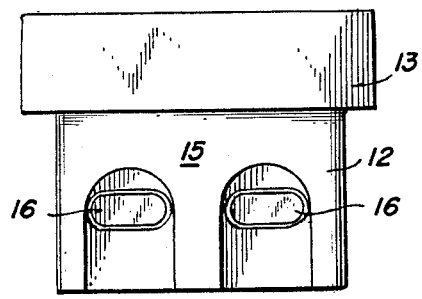
FIG. 3 is an end view of the box without the cover plate on an enlarged scale.
Figure 2:
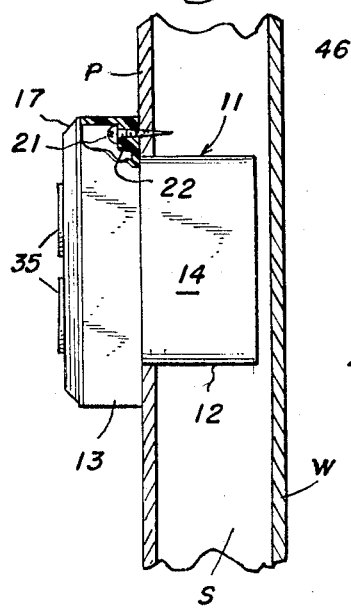
FIG. 2 is a vertical section of the wall showing the box in elevation, with parts broken away and in section to show the manner of fastening the box.
Figure 4:
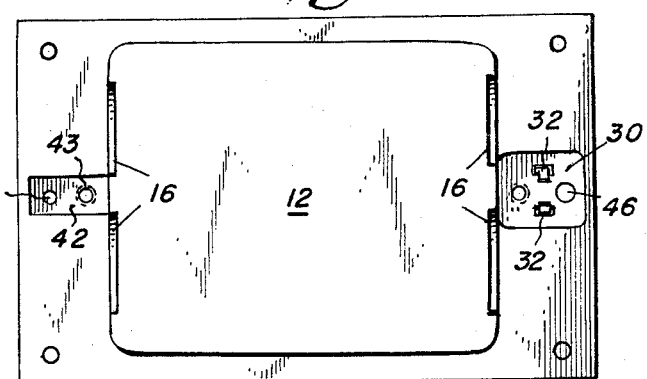
FIG. 4 is a bottom plan view of the box as shown in FIG. 3.

Referring more in detail to the drawings the numeral 11 denotes as a whole my improved box which as seen in FIGS. 1 and 2 is mounted in a shallow wall such as used in mobile homes and in prefabricated dwellings and other prefabricated building structures. The wall is conventionally shown as consisting of an exterior wall portion W and an interior wall portion P of plywood or other material, separated by a space S, which is substantially smaller than the space between the inner and outer portions of the usual walls of dwellings and buildings.

The preferred form of box 11 shown in FIGS. 1–8 is particularly adapted for such thin or shallow walls, and it comprises a relatively shallow rectangular body 12 adapted to be inserted in an opening formed in the interior wall P and a surrounding extension or enlargement 13 at the open face adapted to be disposed against that wall as shown in FIG. 2. The entire box is molded in one piece of a hard plastic insulating material such as phenolic resin and in the most simple type of molding press in which the movable die part has a straight line movement and there are no laterally movable die parts.

The body 12 has a bottom with a surrounding wall having opposed sides 14 and opposed ends 15 in which latter may be formed lead-in openings or knockouts 16. The body 12 may have a length of 3", a width of 2¼" and a depth of about 1½", while the enlargement or extension 13 has an overall length of 4⁹⁄₁₆" and a width of 2¾", these two dimensions being those of the standard wall plate 17 used on the now commonly used switch and outlet boxes. The extension 13 is formed by a flat bottom wall 18 projecting at right angles to the body walls 14 and 15, and an upstanding or outwardly projecting surrounding side wall or rim 19. Hence the box is provided with additional space by enlarging its front part to a size so that a standard wall plate will just cover it, thereby making a finished installation. The height of the rim 19 may vary but with a box of the above stated dimensions, it may be approximately ¾". The long sides of the rim 19 may be strengthened by upright reinforcing ribs 20 molded on its inner face. The thus increased cubical capacity of the box permits of the use of larger conductors such as gage 12 or 10 which are becoming more necessary so that more power can be supplied to the outlet to take care of the many new electrical appliances that have come into common use over the past years.

The lateral extension or enlargement of the top or open part of the box also provides for mounting holes, thus eliminating the necessity of metal ears or brackets for mounting the insulating box. As shown in FIGS. 2 and 5, the bottom 18 of the extension 13 is formed at the four corners with holes to receive screws 21 that are threaded into the wall P and form the sole means for mounting the box. These holes are formed in thickened portions or enlargements 22 at the junction of the parts 18 and 19.

The extension or enlargement 13 further provides a space within the top of the box, but off-set from the interior of the body portion 12, for the mounting of a ground strap or plate 25 where the latter will be readily accessible for the easy attachment of wires and for examination by the electrical inspector who checks the finished installation. The ground plate 25, which is adapted to be in electrical contact with the metal mounting strap of a duplex outlet, switch or the like as later described, is an elongated generally rectangular shaped strip of sheet metal which has a flat central portion 26 and depressed or downwardly offset ends 27 carrying binding screws 28 for the attachment of wires. The ground plate extends transversely of the box at one of its ends and its central portion rests on and is fixed to the top of an upright post or support 29 at the center of one end of the extension 13, as seen in FIGS. 5, 6 and 7. This supporting means or post 29 which is also used to support one end of the usual mounting strap of an electrical device used in box, is integral with the wall 18 and the rim 19, and it is made hollow by forming in the under side of the extension a recess 30 that leaves a flat top wall 31. The ground plate 25 is fixed on the post 29 by providing on one side of its flat portion 26 two downwardly struck prongs 32 adapted to be inserted in holes 33 formed in the wall 31 and to be then bent or clinched by a power press operation to the positions shown in FIG. 8.

In FIGS. 1, 2 and 6 I have shown a conventional form of duplex outlet 35 mounted in the box and having the usual metal mounting plate or strap 36 and portions disposed in openings in the cover or wall plate 17. One end of the strap 36 rests on the central part of the ground strap 25 and is fastened by the usual screw 37 in a threaded hole 38 in strap 25 and a hole 39 in the wall 31. The hole 39 may also be screw threaded. To insure a good electrical contact between the parts 25 and 36, small raised bosses 40 may be stamped in the ground strap but the small end 31 is disposed close to the plane of the outer edge of the rim 19 so that the strap 25 will be in or slightly above that plane.

The other end of the strap 36 is supported on the top of an upright enlargement or post 41 molded on the inside of the rim 19 and rising from the bottom 18 of the extension 13. As shown in FIG. 6 a recess 42 is formed in the bottom of the extension and the post 41, and in the top of the latter is a screw threaded hole 43 engaged by the usual screw 44 which fastens the adjacent end of strap 36. The wall plate 17 is usually fastened to the switch or duplex outlet 35 by a central screw 45 but in some cases screws near the ends of the plate are used, and to accommodate the ends of such screws, additional holes 46 are formed in the top walls of the posts 41 and 29. The screw threaded holes such as 43 are preferably molded with thin breakable flashes over the outer ends to exclude plaster, in accordance with the disclosures in the Parker Patent No. 2,867,349, January 6, 1959, and the Baxter and Palmer Patent No. 2,775,916, January 1, 1957.

The ground strap 25 is used by connecting the equipment ground wire of the non-metallic cable entering one of the knockout openings, to the screw on one of the ends 27. If the circuit is to continue beyond the box, the equipment grounding wire of the cable leaving the box may be fastened under the screw at the other end 27.

Figure 10:
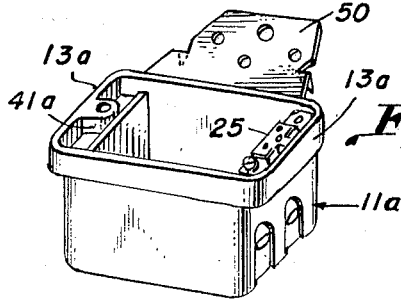
FIG. 10 is a perspective view showing the ground strap mounted in a different form of box.

The construction, mounting and manner of using the ground strap 25 in the box 11ª shown in FIG. 10 is the same as that previously described. This plastic box 11ª is shown as carrying a suitably fixed sheet metal mounting bracket 50 adapted to be fastened to a building structure. In this box the extension does not extend entirely around the open top of the box but extends across each end wall as shown at 13ª. If desired the bottoms of the extensions 13ª may have mounting screw holes. The ground strap 25 is mounted in one of the extended ends 13ª and supports one end of the fastening or mounting strap of a duplex outlet or other device, the other end of such mounting strap being supported on a post 41ª which corresponds to the post 41. As above stated the strap 25 in the box of FIG. 10 is of the same construction as that shown in FIG. 9 and is supported and fixed in the same manner as that shown in FIGS. 6, 7 and 8.

By mounting the ground strap in a lateral extension or enlargement at the open top of the box it is not only spaced from the interior of the box body but is located where wires may be conveniently fastened to it and where the grounding connections may be readily checked by an electrical inspector. It will be noted that both the extension 13 and the extension 13ª form chambers which are laterally offset from but in communication with the interior of the box body, so that the ground strap is away from the conductors and other parts in the box. It will also be noted that by molding the hollow support 29 with apertures 33, the ground strap may be quickly and effectively fixed to the box in an inexpensive manner by a machine operation. The extension 13 and the extension 13ª, when the metal mounting bracket 50 is not used, provides an area for mounting screw holes, thus doing away with the use of metal ears or brackets such as 50, and also permits of the use of a standard size wall plate to close the box and provide a finished appearance, since the flat bottoms of the enlargements or extensions 13 or 13ª may rest on the outer surface of the thin walls used in trailer and prefab work. In such work deep boxes cannot be used and if a box is made larger in a lateral direction, standard electrical devices and wall plates cannot be used. It is of course to be understood that if desired, the usual conductor clamping plates may be mounted in the box with screws to clamp the cables entering through the knockouts.

From the foregoing, taken in connection with the accompanying drawing, it will be seen that novel and advantageous provision has been made for carrying out the objects of the invention, and while preferences have been disclosed, attention is invited to the possibility of making variations within the scope of the invention as claimed.

I claim:

1. An insulating electric wiring box for use in a thin wall having closely spaced inner and outer wall portions, comprising in combination:
    (a) an open face relatively shallow box body made of molded plastic insulating material and having a bottom wall and a surrounding side wall with opposed end portions;
    (b) an integral enlargement extending entirely around the body at its open face and projecting laterally from said side wall, said enlargement comprising
    (c) a flat bottom wall molded integrally with said side wall and projecting at right angles thereto, and
    (d) an outwardly projecting rim molded integral with and rising from the edge of said bottom wall of the enlargement, whereby the latter forms a surrounding outer chamber in communication with the interior of the body to increase the cubic capacity of the box;
    (e) said bottom wall of the enlargement being adapted to seat on the face of a thin wall when said body is inserted in an opening in the latter and being formed with a plurality of holes to receive fasteners which form the sole means that mounts the box on the wall;
    (f) the outer edge of said rim being disposed in a plane parallel with said bottom wall of the body and adapted to be covered by a face plate of standard size to close the box;
    (g) an electrical device supporting post in said chamber adjacent each of said opposed end portions of the box wall and molded integral with said rim and bottom wall of the enlargement, said posts having flat outer ends disposed substantially in the plane of said outer edge of the rim, and adapted to support the ends of a mounting strap of an electrical device used in the box;
    (h) a flat ground strap disposed in said chamber on the said flat outer end of one of said posts and having
    (i) an inwardly offset portion with means for the attachment of a wire thereto; and
    (j) means fixing said ground strap to the said post in a position that one end of the mounting strap of an electrical device will be in electrical contact with the ground strap;
    (k) the said post carrying said ground strap being hollow to provide said flat wall forming said outer end of the post, such end wall being provided with spaced openings, and (*l*) a pair of spaced bendable prongs integral with said ground strap and projecting from one of its edges at right angles, said prongs being disposed in the openings in said top wall and clinched to form said means which fixes the ground strap to its post.

2. In an insulating electric wiring box having a generally rectangular body with an open face and made of molded plastic insulating material, said body having a bottom wall and opposed side and end walls, means for mounting a ground strap in said box, said means comprising in combination:

(*a*) integral enlargements molded at least on said end walls at the open face of the box and projecting laterally therefrom, each of said enlargements comprising (*b*) a flat bottom wall integral with an end wall and projecting at right angles thereto, and (*c*) an outwardly projecting rim integral with and rising from the edge of said bottom wall of the enlargement, whereby the box is provided at each end with an outer chamber in communication with the interior of the body;

(*d*) an electrical device supporting post in each of said chambers, said posts being integral with the respective bottom walls and rims of the enlargements, (*e*) said post having flat top walls disposed substantially in the plane of the outer edges of said rims and adapted to support the ends of a mounting strap of an electric device used in the box;

(*f*) at least one of said posts being hollow and having its top wall formed with spaced openings, (*g*) a flat ground strap disposed on the top of said hollow post and having an inwardly offset portion provided with means for the attachment of a wire thereto, (*h*) a pair of bendable prongs integral with one edge of said ground strap and projecting at right angles thereto, said prongs being disposed in said openings in the top wall of the said post and clinched to fix the ground strap to its post in a position to be in electrical contact with one of the ends of a mounting strap of an electrical device.

3. An insulating electric wiring box comprising in combination (*a*) an open face box body made of molded plastic insulating material and having a bottom and a surrounding side wall;

(*b*) integral enlargements molded at opposite points on said side wall at the open face of the body and projecting laterally therefrom; each of said enlargements comprising (*c*) a flat bottom wall integral with said side wall and projecting at right angles thereto; and (*d*) an outwardly projecting rim integral with and rising from the edge of said bottom wall of the enlargement, whereby the box is provided at said opposite points with an outer chamber in communication with the interior of the body;

(*e*) an electrical device supporting post in each of said chambers, said posts being integral with the respective bottom walls and rims of the enlargements;

(*f*) said posts having flat top walls disposed substantially in the plane of the outer edges of said rims and adapted to support the ends of a mounting strap of an electrical device used in the box;

(*g*) at least one of said posts being hollow and having its top wall formed with spaced openings;

(*h*) a flat ground strap disposed on the top of said hollow post and having an inwardly offset portion provided with means for the attachment of a wire thereto;

(*i*) a pair of bendable prongs on said ground strap projecting into said openings and clinched to fix the ground strap on its post in a position to be in electrical contact with one of the ends of a mounting strap of an electrical device.

References Cited in the file of this patent

UNITED STATES PATENTS

| | | |
|---|---|---|
| 917,348 | Newton | Apr. 6, 1909 |
| 1,228,731 | Abbott et al. | June 5, 1917 |
| 1,932,018 | Hubbell | Oct. 24, 1933 |
| 2,414,575 | Windsor | Jan. 21, 1947 |
| 2,710,949 | Harpe | June 14, 1955 |
| 2,867,349 | Parker | Jan. 6, 1959 |
| 2,872,503 | Winter | Feb. 3, 1959 |
| 2,909,710 | Platt | Oct. 20, 1959 |
| 3,004,095 | Buzak | Oct. 10, 1961 |

FOREIGN PATENTS

| | | |
|---|---|---|
| 859,649 | Germany | Dec. 15, 1952 |